(12) United States Patent
Lin et al.

(10) Patent No.: US 10,627,874 B2
(45) Date of Patent: Apr. 21, 2020

(54) ELECTRONIC DEVICE

(71) Applicant: ASUSTeK COMPUTER INC., Taipei (TW)

(72) Inventors: Hsin-Chen Lin, Taipei (TW); Ing-Jer Chiou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/264,878

(22) Filed: Feb. 1, 2019

(65) Prior Publication Data
US 2019/0250674 A1 Aug. 15, 2019

(30) Foreign Application Priority Data
Feb. 13, 2018 (CN) .......................... 2018 1 0148878

(51) Int. Cl.
*G06F 1/16* (2006.01)
*G06F 1/20* (2006.01)
*F16M 13/00* (2006.01)

(52) U.S. Cl.
CPC ......... *G06F 1/1681* (2013.01); *F16M 13/005* (2013.01); *G06F 1/1616* (2013.01); *G06F 1/203* (2013.01)

(58) Field of Classification Search
CPC ........ G06F 1/1616; G06F 1/1681; G06F 1/20; G06F 1/203
USPC ................ 361/679.46, 679.27, 688–690
See application file for complete search history.

(56) References Cited

U.S. PATENT DOCUMENTS

| | | | | |
|---|---|---|---|---|
| 6,175,492 B1 * | 1/2001 | Nobuchi | ............... | G06F 1/1616 361/679.08 |
| 6,437,978 B1 * | 8/2002 | Ozaki | ............... | G06F 1/203 165/104.33 |
| 6,459,573 B1 * | 10/2002 | DiStefano | ............... | G06F 1/203 361/679.46 |
| 7,894,184 B2 * | 2/2011 | Huang | ............... | G06F 1/1616 361/679.11 |
| 8,520,382 B2 * | 8/2013 | Tye | ............... | G06F 1/203 248/685 |
| 9,104,374 B2 * | 8/2015 | Tsai | ............... | G06F 1/1616 |
| 9,740,253 B2 * | 8/2017 | Cheng | ............... | G06F 1/203 |
| 10,149,405 B2 * | 12/2018 | Chou | ............... | G06F 1/203 |
| 10,289,176 B1 * | 5/2019 | Chen | ............... | G06F 1/203 |

(Continued)

FOREIGN PATENT DOCUMENTS

TW M385909 U1 8/2010
TW I419642 B 12/2013
(Continued)

*Primary Examiner* — Anthony Q Edwards
(74) *Attorney, Agent, or Firm* — McClure, Qualey & Rodack, LLP (57) ABSTRACT

The disclosure discloses an electronic device. The electronic device includes a first enclosure, a second enclosure, a plurality of components, a rotating shaft assembly, and at least one drive member. The components are disposed on the second enclosure. The rotating shaft assembly is disposed in the second enclosure and is connected to the first enclosure. The drive member is connected to the rotating shaft assembly. When the first enclosure is opened relative to the second enclosure, the rotating shaft assembly drives the drive member to push the components, to enable the components to move away from the rotating shaft assembly.

9 Claims, 7 Drawing Sheets

(56) References Cited

U.S. PATENT DOCUMENTS

| | | | | |
|---|---|---|---|---|
| 10,416,727 B2* | 9/2019 | Lin | ................. | G06F 1/1681 |
| 2005/0024822 A1* | 2/2005 | Janicek | ................. | G06F 1/1616 |
| | | | | 361/679.46 |
| 2007/0230120 A1* | 10/2007 | Hata | ................. | G06F 1/1616 |
| | | | | 361/690 |
| 2011/0292605 A1* | 12/2011 | Chen | ................. | G06F 1/1616 |
| | | | | 361/695 |
| 2012/0127652 A1* | 5/2012 | Lin | ................. | G06F 1/203 |
| | | | | 361/679.46 |
| 2013/0027873 A1* | 1/2013 | Chen | ................. | G06F 1/203 |
| | | | | 361/679.46 |
| 2017/0060201 A1* | 3/2017 | Prather | ................. | G06F 1/203 |
| 2019/0094918 A1* | 3/2019 | Lin | ................. | G06F 1/166 |

FOREIGN PATENT DOCUMENTS

| | | |
|---|---|---|
| TW | M534954 U | 1/2017 |
| TW | M537669 U | 3/2017 |

\* cited by examiner

FIG. 7B

ELECTRONIC DEVICE

CROSS-REFERENCE TO RELATED APPLICATION

This application claims the priority benefit of China application serial No. 201810148878.8, filed on Feb. 13, 2018. The entirety of the above-mentioned patent application is hereby incorporated by reference herein and made a part of the specification.

BACKGROUND OF THE INVENTION

Field of the Invention

The disclosure relates to an electronic device, and in particular, to an electronic device having a dissipation structure.

Description of the Related Art

With the progress of technologies, the performance of an electronic calculator significantly develops. In recent years, the performance of a notebook computer is not inferior to a desktop computer. The requirement for portability of the notebook computer makes the volume of the notebook computer smaller. However, unlike the desktop computer, the notebook computer has neither relatively large dissipation space nor a plurality of cooling fans to improve dissipation, which is the limitation with small volume. As a result, the notebook computer is in a high-temperature environment for a long time due to an excessively slow heat dissipation speed that brings easily breakdown and shortened the life of components.

BRIEF SUMMARY OF THE INVENTION

The disclosure discloses an electronic device. The electronic device includes a first enclosure, a second enclosure, a plurality of components, a rotating shaft assembly, and at least one drive member. The components are disposed on the second enclosure. The rotating shaft assembly is disposed in the second enclosure and is connected to the first enclosure. The drive member is connected to the rotating shaft assembly. When the first enclosure is opened relative to the second enclosure, the rotating shaft assembly drives the drive member to push the components, to enable the components to move away from the rotating shaft assembly.

In conclusion, in the electronic device of the disclosure, when the first enclosure is opened relative to the second enclosure, the first enclosure simultaneously drives the connected rotating shaft assembly to actuate, and the actuated rotating shaft assembly simultaneously drives the drive member to actuate, to further enable the actuated drive member to simultaneously push the plurality of components to move. By operating an angle at which the first enclosure is opened or closed relative to the second enclosure, the electronic device of the disclosure simultaneously drives the plurality of components by using the drive member, thereby providing more application effectively.

BRIEF DESCRIPTION OF THE DRAWINGS

To make the foregoing and other objectives, features, advantages, and embodiments of the disclosure more comprehensible, descriptions of the accompanying drawings are as follows.

DETAILED DESCRIPTION OF THE EMBODIMENTS

The following describes a plurality of embodiments of the disclosure with reference to the accompany drawings. For clarity, many practical details are described together in the following description. However, it should be understood that, the practical details should not be used for limiting the disclosure. That is, in one embodiment of the disclosure, the practical details are not necessary. In addition, for simplicity, some known structures and elements are drawn in the accompanying drawings in simple and exemplary manners.

Figure 1:
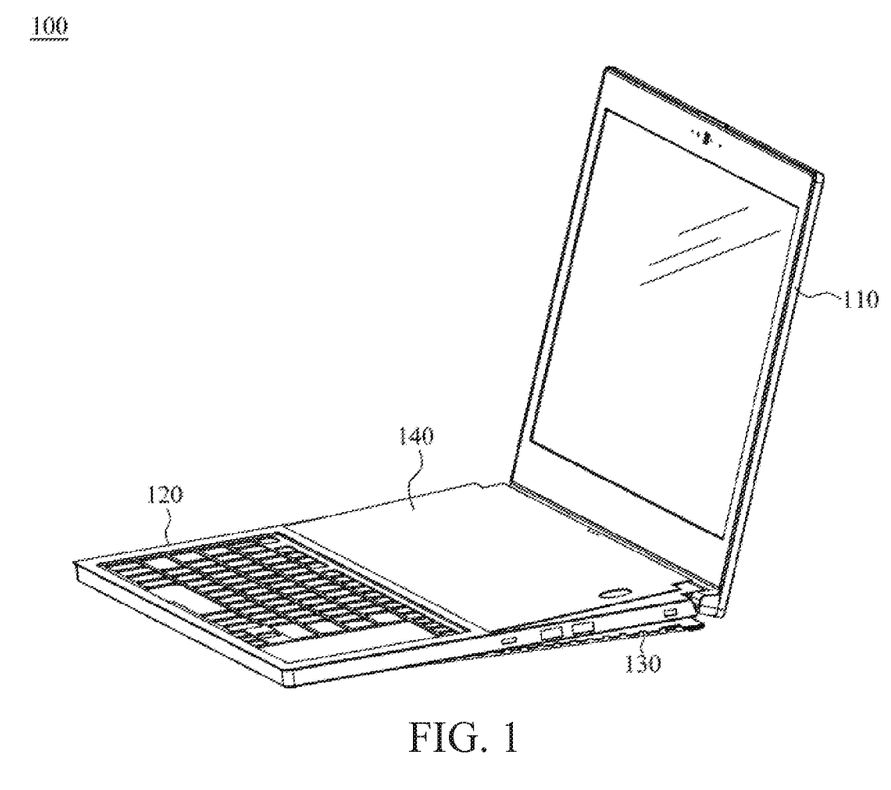
FIG. 1 is a three-dimensional diagram of an electronic device according to an embodiment of the disclosure, where a first enclosure is opened relative to a second enclosure.
Figure 2A:
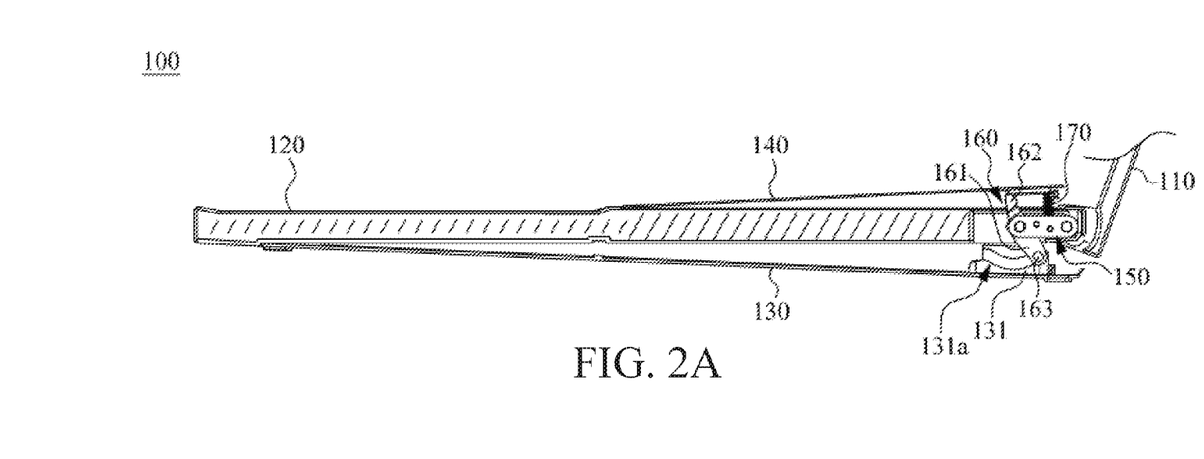
FIG. 2A is a partial cutaway side view of the electronic device in FIG. 1, where the first enclosure covers the second enclosure.
Figure 2B:
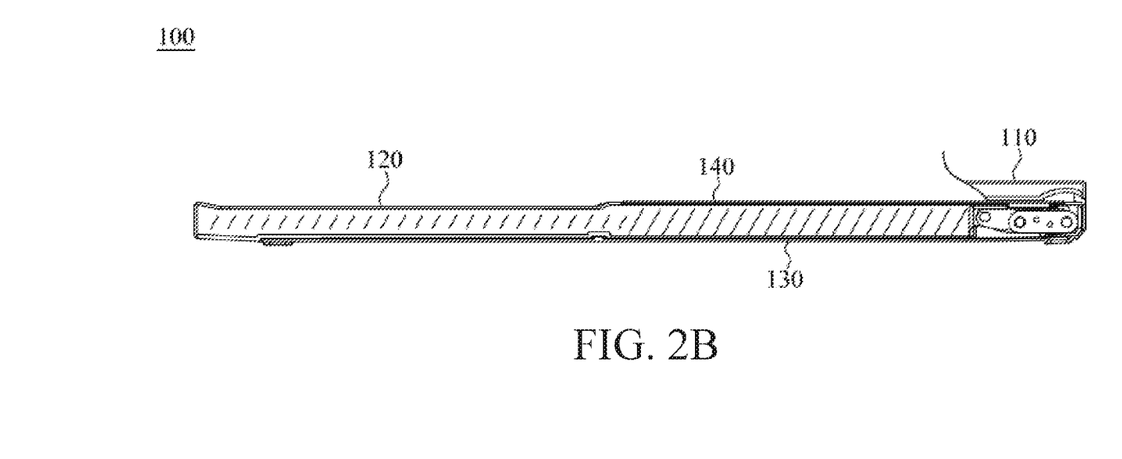
FIG. 2B is another partial cutaway side view of the electronic device in FIG. 1, where the first enclosure is opened relative to the second enclosure.

Referring to FIG. 1, FIG. 2A, and FIG. 2B. FIG. 1 is a three-dimensional diagram of an electronic device 100 according to an embodiment of the disclosure, where a first enclosure 110 is opened relative to a second enclosure 120. FIG. 2A is partial cutaway side view of the electronic device 100 in FIG. 1, where the first enclosure 110 covers the second enclosure 120. FIG. 2B is another partial cutaway side view of the electronic device 100 in FIG. 1, where the first enclosure 110 is opened relative to the second enclosure 120. The following describes in detail the structures and functions of elements included in the electronic device 100 as well as connection and actuation relationships of the elements.

As shown in FIG. 1 to FIG. 2B, in the application, the electronic device 100 includes the first enclosure 110, the second enclosure 120, a first component 130, a second component 140, a rotating shaft assembly 150, and a drive member 160. The first component 130 and the second component 140 are disposed on the second enclosure 120. The rotating shaft assembly 150 is disposed in the second enclosure 120 and is connected to the first enclosure 110. The drive member 160 is connected to the rotating shaft assembly 150. When the first enclosure 110 is opened relative to the second enclosure 120, the rotating shaft assembly 150 drives the drive member 160 to push the first component 130 and the second component 140, to enable the first component 130 and the second component 140 to move away from the rotating shaft assembly 150.

Figure 3A:
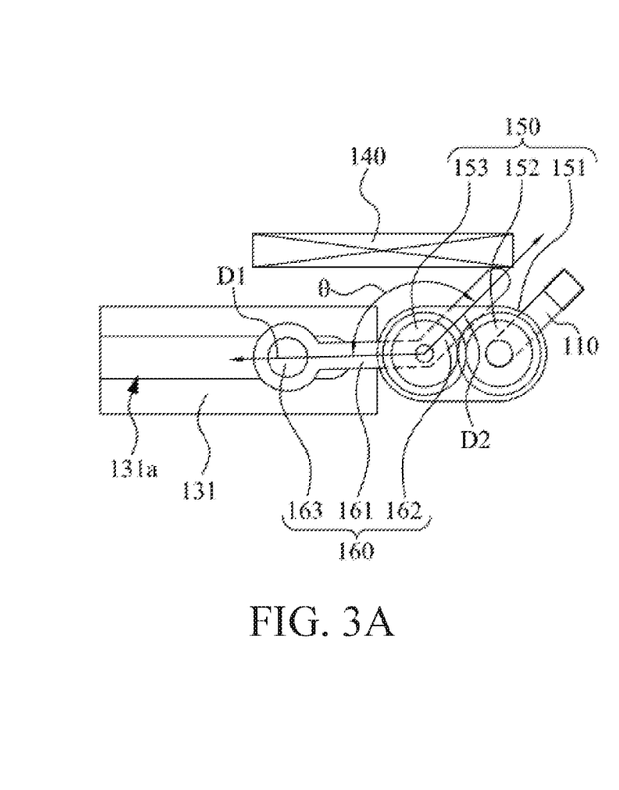
FIG. 3A and FIG. 3B are respectively simple schematic diagrams of some elements of the electronic device in FIG. 1 opened at different angles.
Figure 3B:
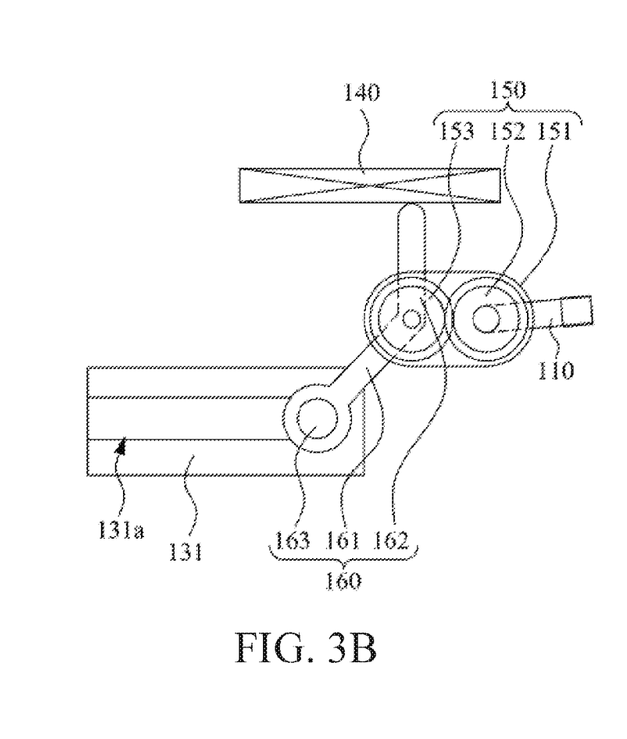

Referring to FIG. 3A and FIG. 3B, FIG. 3A and FIG. 3B are respectively simple schematic diagrams of some elements of the electronic device 100 in FIG. 1 opened at different angles. As shown in FIG. 3A and FIG. 3B, in this embodiment, the rotating shaft assembly 150 includes a fixing base 151, a first gear 152, and a second gear 153. The fixing base 151 is disposed in the second enclosure 120. The first gear 152 and the second gear 153 are engaged with each other, and center axes of the first gear 152 and the second gear 153 are respectively pivotally connected to fixing base 151. In this way, the first gear 152 and the second gear 153 rotate at fixed positions in the second enclosure 120.

In one embodiment, the fixing base 151 and the second enclosure 120 are an integrated structure, but the disclosure is not limited thereto.

The first enclosure 110 and the drive member 160 are respectively connected to the first gear 152 and the second gear 153. The drive member 160 has a first extended portion 161 and a second extended portion 162. The first extended portion 161 and the second extended portion 162 are each configured to push the first component 130 and the second component 140. In one embodiment, as shown in FIG. 3A and FIG. 3B, the first component 130 includes a sliding table 131. The sliding table 131 has a guiding sliding slot 131*a*. The drive member 160 has a slider 163 slidably connected to the guiding sliding slot 131*a*. In this way, when the first enclosure 110 is switched from an opened state shown in FIG. 2A to a closed state shown in FIG. 2B, the drive member 160 still drives, by using connection engagement between the slider 163 disposed on the first extended portion 161 and the guiding sliding slot 131*a*, the first component 130 to reset (that is, to enable the first component 130 to re-cover the second enclosure 120).

According to the foregoing structural configuration, when the first enclosure 110 is opened relative to the second enclosure 120, the first enclosure 110 simultaneously drives the connected first gear 152 to rotate, and the second gear 153 engaged with the first gear 152 also simultaneously drives the drive member 160 to rotate, to further simultaneously enable the rotating drive member 160 to push the first component 130 and the second component 140 by using the first extended portion 161 and the second extended portion 162, so that the first component 130 and the second component 140 move. By operating an angle at which the first enclosure 110 is opened or closed relative to the second enclosure 120, the electronic device 100 in this embodiment simultaneously drives a plurality of components by using the drive member 160, thereby effectively increasing overall application.

As shown in FIG. 2A and FIG. 2B, in this embodiment, the first component 130 and the second component 140 are each located on two opposite sides of the rotating shaft assembly 150 (that is, an upper side and a lower side of the rotating shaft assembly 150). In addition, the first component 130 and the second component 140 are each further configured to cover two opposite sides of the second enclosure 120 (that is, an upper side and a lower side of the second enclosure 120).

In one embodiment, the first component 130 and the second component 140 are each pivotally connected to the second enclosure 120, and are each configured to cover two cover bodies between a top portion and a bottom portion of the second enclosure 120 (that is, the second enclosure 120 is a frame), but the disclosure is not limited thereto. In this way, opening of the first enclosure 110 relative to the second enclosure 120 enables the upper cover body and the lower cover body of the second enclosure 120 to be opened at the same time, so that a heat source (not shown) disposed in the second enclosure 120 provides better dissipation.

In some other embodiments, the second component 140 is a keyboard module. In an embodiment, when the first enclosure 110 covers the second enclosure 120, most of the second component 140 is sunk into the second enclosure 120; or when the first enclosure 110 is opened relative to the second enclosure 120, most part of the second component 140 moves to be projected over the second enclosure 120.

In one embodiment, as shown in FIG. 2A and FIG. 2B, the first extended portion 161 and the second extended portion 162 of the drive member 160 each extend along a first direction D1 and a second direction D2 from the second gear 153, and an angle θ between the first direction D1 and the second direction D2 is an obtuse angle. In this way, in a position configuration in which the first component 130 and the second component 140 are each located on the two opposite sides of the rotating shaft assembly 150, the first component 130 and the second component 140 are pushed by the drive member 160 to move away from the rotating shaft assembly 150.

In addition, the second extended portion 162 of the drive member 160 is configured to abut against the second component 140, so that when the first enclosure 110 is switched from the closed state shown in FIG. 2B to the opened state shown in FIG. 2A, the second extended portion 162 pushes the second component 140 to move away from the second enclosure 120. To enable the second component 140 to re-cover the second enclosure 120 when the first enclosure 110 is switched from the opened state shown in FIG. 2A to the closed state shown in FIG. 2B, as shown in FIG. 2A, the electronic device 100 in the embodiment further includes a reset member 170. The reset member 170 is connected between the second enclosure 120 (or the fixing base 151 of the rotating shaft assembly 150) and the second component 140, and is configured to enable the second component 140 to cover the second enclosure 120. In one embodiment, the reset member 170 is a tension spring, but the disclosure is not limited thereto.

In some other embodiments, the second component 140 and the second extended portion 162 are also provided with structures the same as the sliding table 131 and the slider 163, to enable the second component 140 to reset, when the first enclosure 110 is switched from the opened state shown in FIG. 2A to the closed state shown in FIG. 2B, to cover the second enclosure 120.

Figure 4A:
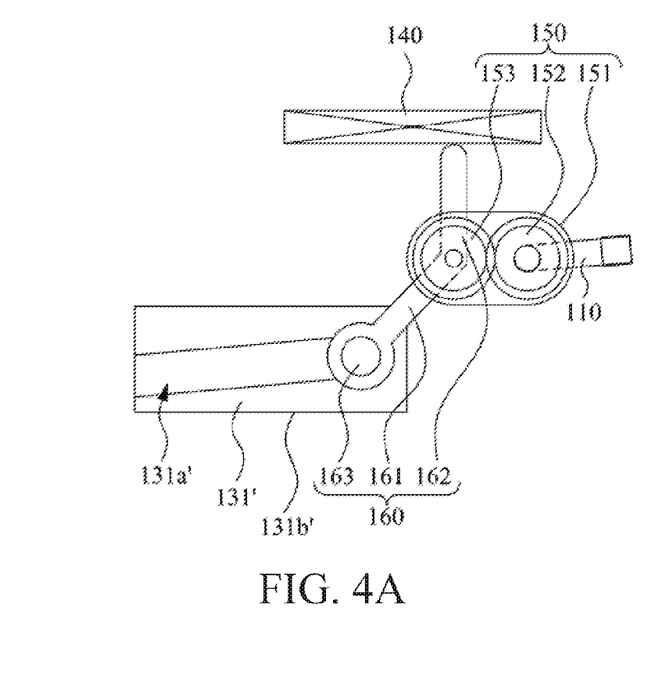
FIG. 4A is a simple schematic diagram of some elements of an electronic device according to another embodiment of the disclosure.
Figure 4B:
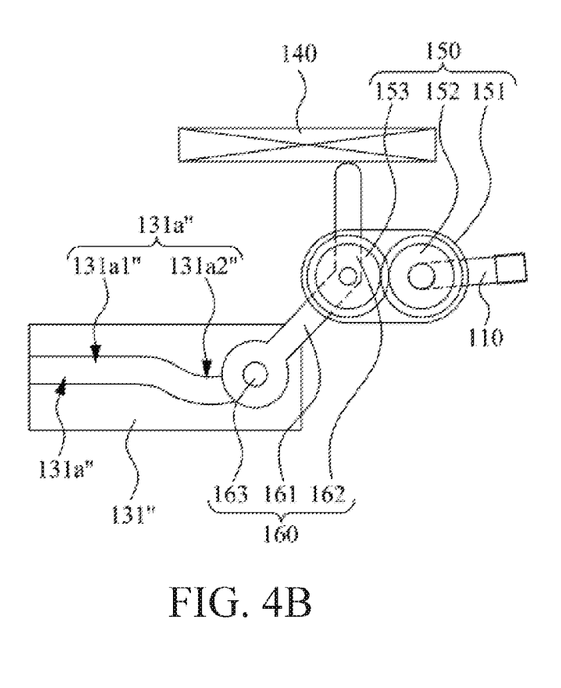
FIG. 4B is a simple schematic diagram of some elements of an electronic device according to another embodiment of the disclosure.

Referring to FIG. 4A and FIG. 4B, FIG. 4A is a simple schematic diagram of some elements of the electronic device 100 according to another embodiment of the disclosure, and FIG. 4B is a simple schematic diagram of some elements of the electronic device 100 according to another embodiment of the disclosure. The embodiment shown in FIG. 4A is different from the embodiment shown in FIG. 3A in that an extension direction of a guiding sliding slot 131*a*' on a sliding table 131' shown in FIG. 4A is inclined in a more steeply manner than an extension direction of a guiding sliding slot 131*a* on the sliding table 131 shown in FIG. 3A. In addition, it can be learned from FIG. 4A that, the sliding table 131' has a bottom surface 131b'. The bottom surface 131b' is located on a side on the sliding table 131' away from the second component 140. The extension direction of the guiding sliding slot 131a' is inclined relative to the bottom surface 131b'. The embodiment shown in FIG. 4B is different from the embodiment shown in FIG. 3A in that, a guiding sliding slot 131a" on a sliding table 131" shown in FIG. 4B has a straight segment 131a1" and a curved segment 131a2". A change of a track of the guiding sliding slot 131a shown in FIG. 3A achieves application of different strokes of the first component 130 and the second component 140.

Figure 5A:
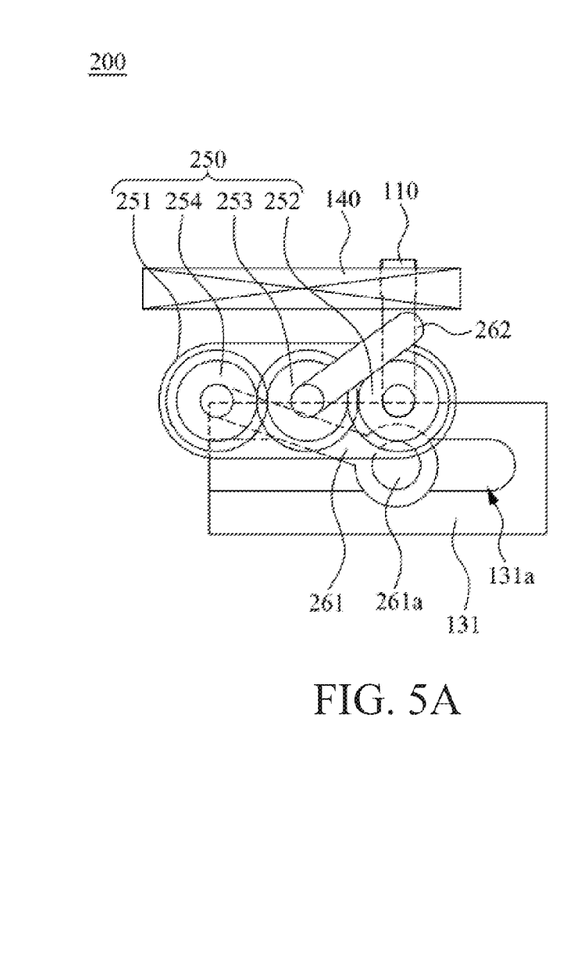
FIG. 5A and FIG. 5B are respectively simple schematic diagrams of some elements of an electronic device opened at different angles according to another embodiment of the disclosure.
Figure 5B:
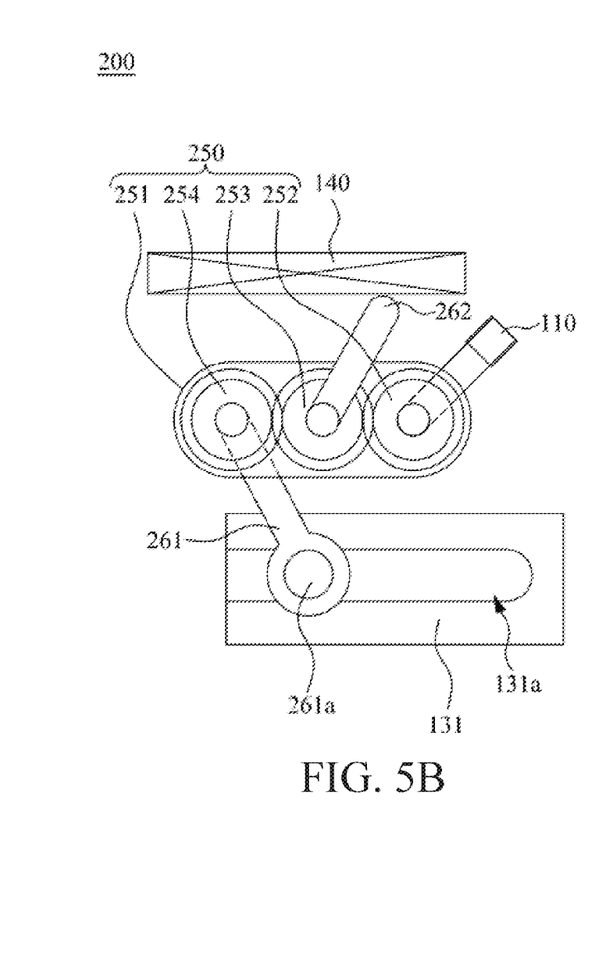

Referring to FIG. 5A and FIG. 5B, FIG. 5A and FIG. 5B are respectively simple schematic diagrams of some elements of an electronic device 200 opened at different angles according to another embodiment of the disclosure. In the embodiment, the electronic device 200 includes a first enclosure 110, a second enclosure 120 (referring to FIG. 2A), a first component 130 (referring to FIG. 2A), a second component 140, a rotating shaft assembly 250, a first drive member 261, and a second drive member 262. The first enclosure 110, the second enclosure 120, the first component 130, and the second component 140 are the same as those in the embodiments shown in FIG. 2A to FIG. 3A, and therefore reference may be made to the foregoing related descriptions.

The embodiment is different from the embodiment shown in FIG. 3A in that, the rotating shaft assembly 250 in the embodiment includes a fixing base 251, a first gear 252, a second gear 253, and a third gear 254. The fixing base 251 is disposed in the second enclosure 120 (referring to FIG. 2A). The first gear 252, the second gear 253, and the third gear 254 are sequentially engaged, and center axes of the first gear 252, the second gear 253, and the third gear 254 are each pivotally connected to the fixing base 251. In this way, the first gear 252, the second gear 253, and the third gear 254 rotate at fixed positions in the second enclosure 120 (referring to FIG. 2A).

The embodiment is also different from the embodiment shown in FIG. 3A in that, a first drive member 261 and a second drive member 262 of the embodiment are each connected to the second gear 253 and the third gear 254, and are each configured to push a sliding table 131 of the first component 130 and the second component 140. The first drive member 261 has a slider 261a slidably connected to the guiding sliding slot 131a. The first drive member 261 and the second drive member 262 are each connected to the engaged second gear 253 and third gear 254, and therefore when the first enclosure 110 rotates relative to the second enclosure 120 (referring to FIG. 2A), the first drive member 261 rotates toward a direction opposite to a direction toward which the second drive member 262 rotates.

In one embodiment, as shown in FIG. 5A and FIG. 5B, the second gear 253 and the third gear 254 have a same diameter, but the disclosure is not limited thereto.

Figure 6A:
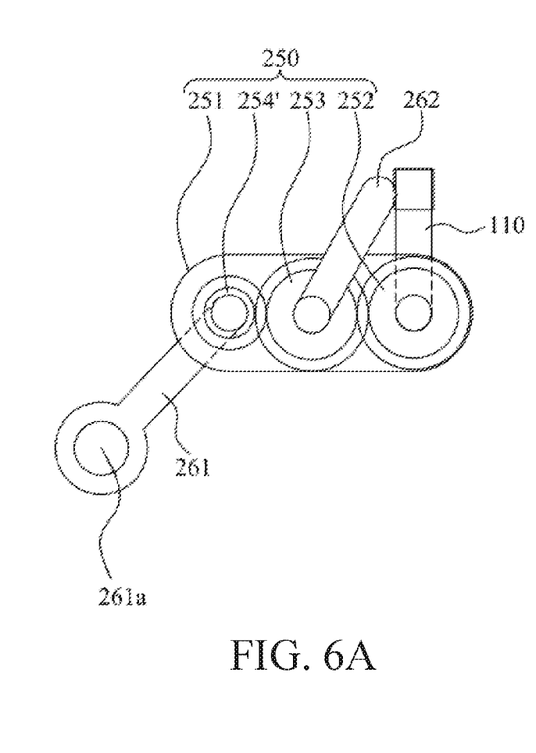
FIG. 6A is a simple schematic diagram of the some elements shown in FIG. 5A according to another embodiment.
Figure 6B:
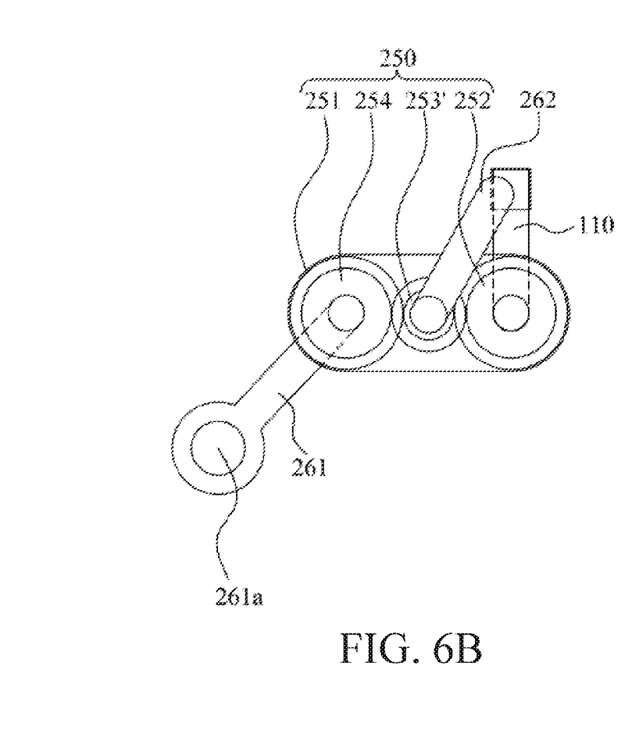
FIG. 6B is a simple schematic diagram of the some elements shown in FIG. 5A according to another embodiment.

Referring to FIG. 6A and FIG. 6B, FIG. 6A is a simple schematic diagram of the some elements of FIG. 5A according to another embodiment, and FIG. 6B is a simple schematic diagram of the some elements of FIG. 5A according to another embodiment. The embodiment shown in FIG. 6A is different from the embodiment shown in FIG. 5A in that, the diameter of a third gear 254' shown in FIG. 6A is less than the diameter of the second gear 253. The embodiment shown in FIG. 6B is different from the embodiment shown in FIG. 5A in that, the diameter of a second gear 253' shown in FIG. 6B is less than the diameter of the third gear 254. A change of the diameter of the second gear 253 or the third gear 254 shown in FIG. 5A achieves application of different strokes of the first component 130 (referring to FIG. 2A) and the second component 140.

In one embodiment, as shown in FIG. 5A and FIG. 5B, both the first drive member 261 and the second drive member 262 are connecting rods, and substantially have a same length, but the disclosure is not limited thereto.

Figure 7A:
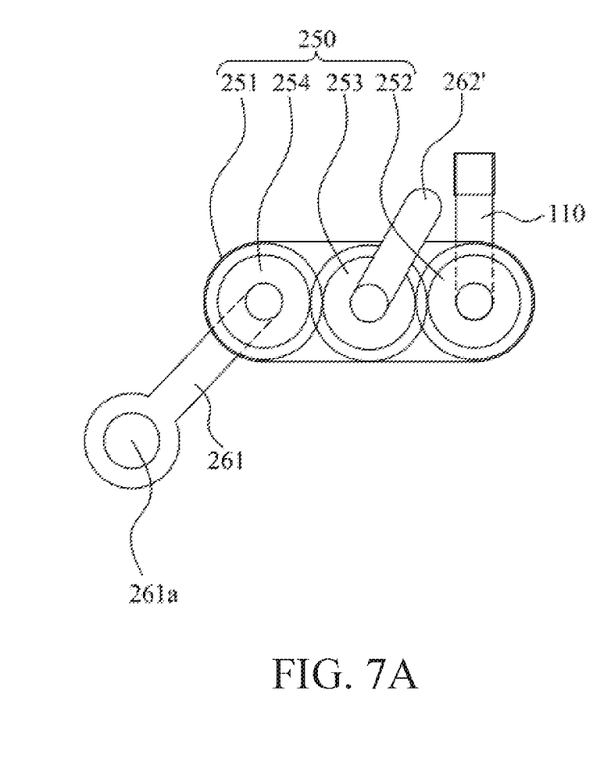
FIG. 7A is a simple schematic diagram of the some elements shown in FIG. 5A according to another embodiment.
Figure 7B:
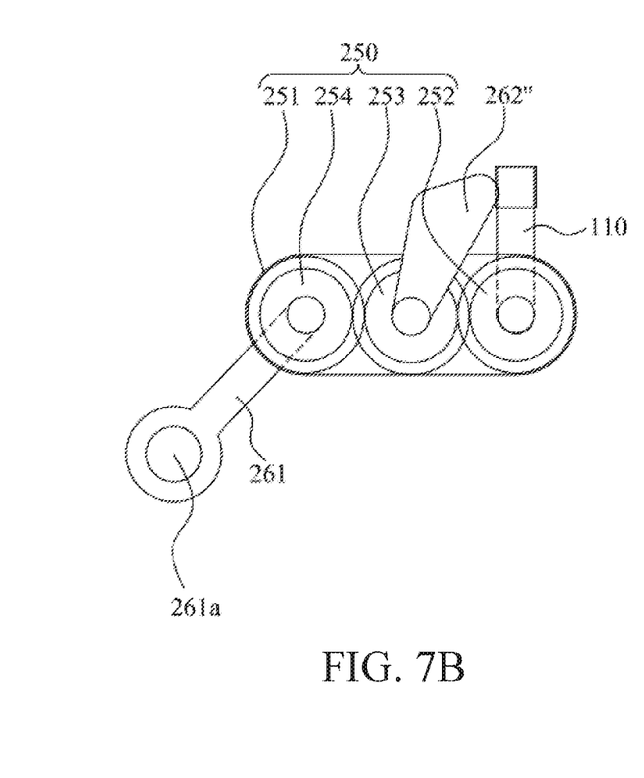
FIG. 7B is a simple schematic diagram of the some elements shown in FIG. 5A according to another embodiment.

Referring to FIG. 7A and FIG. 7B, FIG. 7A is a simple schematic diagram of the some elements of FIG. 5A according to another embodiment, and FIG. 7B is a simple schematic diagram of the some elements of FIG. 5A according to another embodiment. The embodiment shown in FIG. 7A is different from the embodiment shown in FIG. 5A in that, the length of a second drive member 262' shown in FIG. 7A is less than the length of the first drive member 261. In another embodiment, the length of the second drive member 262' is alternatively designed to be greater than the length of the first drive member 261. The embodiment shown in FIG. 7B is different from the embodiment shown in FIG. 5A in that, a second drive member 262" shown in FIG. 7B is a cam. A change of the length or the shape of the second drive member 262 shown in FIG. 5A achieves application of different strokes of the second component 140.

It can be apparently learned from the foregoing detailed descriptions of the specific embodiment s of the disclosure that, in the electronic device of the disclosure, when the first enclosure is opened relative to the second enclosure, the first enclosure simultaneously drives the connected rotating shaft assembly to actuate, and the actuated rotating shaft assembly simultaneously drives the drive member to actuate, to enable the actuated drive member to simultaneously push the plurality of components to move. By operating an angle at which the first enclosure is opened or closed relative to the second enclosure, the electronic device of the disclosure simultaneously drives the plurality of components by using the drive member, thereby effectively increasing overall application.

Although the disclosure has been described with reference to the embodiment embodiments thereof, the embodiment s are not for limiting the disclosure. Persons skilled in the art may make various modifications and polishing without departing from the spirit and scope of the disclosure. Therefore, the protection scope of the disclosure shall be subject to the protection scope of the claims.

What is claimed is:
1. An electronic device, comprising:
    a first enclosure;
    a second enclosure;
    a first component and a second component, disposed on the second enclosure and configured to cover two opposite sides of the second enclosure respectively;
    a rotating shaft assembly, disposed in the second enclosure and connected to the first enclosure; and
    a drive member, connected to the rotating shaft assembly, wherein the drive member is rotatable and is slidably connected to the first component and the second component, when the first enclosure is opened relative to the second enclosure, the rotating shaft assembly drives the drive member to push the first component and the second component, to enable the first component and the second component to move away from the rotating shaft assembly.
2. The electronic device according to claim 1, wherein the rotating shaft assembly comprises a plurality of gears sequentially engaged, and the first enclosure and the drive member are each connected to different gears of the gears.

3. The electronic device according to claim 2, wherein the drive member has two extended portions, and the extended portions are each configured to push the first component and the second component.

4. The electronic device according to claim 3, wherein the extended portions each extend along two directions, and an angle between the directions is an obtuse angle.

5. The electronic device according to claim 2, wherein there is a plurality of drive members, and the drive members are each connected to different gears of the gears, and are each configured to push the first component and the second component.

6. The electronic device according to claim 1, wherein one of the first component and the second component comprises a sliding table having a guiding sliding slot, and the drive member has a slider slidably connected to the guiding sliding slot.

7. The electronic device according to claim 6, wherein the sliding table has a bottom surface located on a side of the sliding table, and the side of the sliding table is away from the second component, and a direction along which the guiding sliding slot extends is inclined relative to the bottom surface.

8. The electronic device according to claim 6, wherein the guiding sliding slot has a straight segment and a curved segment connected to each other.

9. The electronic device according to claim 1, wherein at least one of the first component and the second component are pivotally connected to the second enclosure.

* * * * *